United States Patent
Buttolph

(10) Patent No.: US 10,364,878 B2
(45) Date of Patent: Jul. 30, 2019

(54) COMPACT FLEX GEAR FOR STRAIN WAVE GEARING

(71) Applicant: Simmonds Precision Products, Inc., Vergennes, VT (US)

(72) Inventor: Martin Edwy Buttolph, Leicester, VT (US)

(73) Assignee: Simmons Precision Products, Inc., Vergennes, VT (US)

(*) Notice: Subject to any disclaimer, the term of this patent is extended or adjusted under 35 U.S.C. 154(b) by 311 days.

(21) Appl. No.: 15/332,914

(22) Filed: Oct. 24, 2016

(65) Prior Publication Data

US 2018/0112761 A1    Apr. 26, 2018

(51) Int. Cl.
*F16H 49/00* (2006.01)

(52) U.S. Cl.
CPC ..... *F16H 49/001* (2013.01); *F16H 2049/003* (2013.01)

(58) Field of Classification Search
CPC ................... F16H 49/001; F16H 2049/003

USPC .................................................... 74/640
See application file for complete search history.

(56) References Cited

U.S. PATENT DOCUMENTS

| | | | |
|---|---|---|---|
| 2,906,143 A | 9/1959 | Musser | |
| 5,715,732 A * | 2/1998 | Takizawa | F16H 49/001 475/180 |
| 5,850,765 A * | 12/1998 | Shirasawa | F16H 49/001 74/640 |
| 6,050,155 A * | 4/2000 | Tortora | F16H 49/001 74/640 |
| 6,202,508 B1 * | 3/2001 | Takizawa | F16H 49/001 74/411 |
| 6,250,179 B1 | 6/2001 | Shirasawa | |
| 8,215,205 B2 * | 7/2012 | Zhang | F16H 49/001 74/640 |
| 8,646,360 B2 * | 2/2014 | Kanai | F16H 49/001 74/640 |
| 9,003,924 B2 | 4/2015 | Kanai | |
| 9,157,517 B2 | 10/2015 | Lumin et al. | |

* cited by examiner

*Primary Examiner* — Ha Dinh Ho
(74) *Attorney, Agent, or Firm* — Kinney & Lange, P.A.

(57) ABSTRACT

A flex gear includes a hub with an axis, a rim, and an interface feature, a tooth ring with gear teeth, and flex elements between the rim and the tooth ring.

19 Claims, 4 Drawing Sheets

COMPACT FLEX GEAR FOR STRAIN WAVE GEARING

BACKGROUND

The present invention relates generally to gear systems, and, more particularly, to strain wave gearing.

In general, a strain wave gearing system generally includes a cup-shaped flex gear with an exterior, radially-oriented ring of gear teeth positioned near the rim of the cup and an output hub connected to the base of the cup. Inside of the rim is an elliptically-shaped wave generator with an input hub, wherein the exterior rim of the wave generator has a longer major axis length than a minor axis length. The wave generator elastically deforms the ring of teeth into a corresponding elliptical shape. Surrounding the flex gear is a stationary ring gear with an interior, radially-oriented ring of gear teeth. As the wave generator is rotated in the flex gear, the teeth proximate the major axis of the wave generator engage the teeth of the ring gear, and the teeth proximate the minor axis of the wave generator are drawn in to pass inside of the teeth of the ring gear. The ring gear has more teeth than the flex gear (for example, two more) which causes the flex gear to slowly rotate within the ring gear as the wave generator is rotated rapidly in the opposite direction. Thus, a significant gear reduction is accomplished via a relatively small mechanism.

The configuration and operation of a strain wave gearing system relies on the flex gear being elastically deformable at the ring of gear teeth. But it would be disadvantageous to have the hub portion be similarly flexible because the hub is where the output of the strain wave gearing system is located. To allow flex gear to be flexible in one region and rigid in another, flex gears traditionally have a cup or silk hat shape. Such a shape puts a sufficiently long length of material between the teeth and the hub, allowing the material in the flex gear to elastically deform while minimizing the risk of premature fatigue failure. Unfortunately, this long length increases the overall length of the strain wave gearing system, which can be problematic in applications where space for a gearbox is limited.

SUMMARY

In an embodiment, a flex gear includes a hub with an axis, a rim, and an interface feature, a tooth ring with gear teeth, and flex elements between the rim and the tooth ring.

The present summary is provided only by way of example, and not limitation. Other aspects of the present disclosure will be appreciated in view of the entirety of the present disclosure, including the entire text, claims and accompanying figures.

Figure 1:
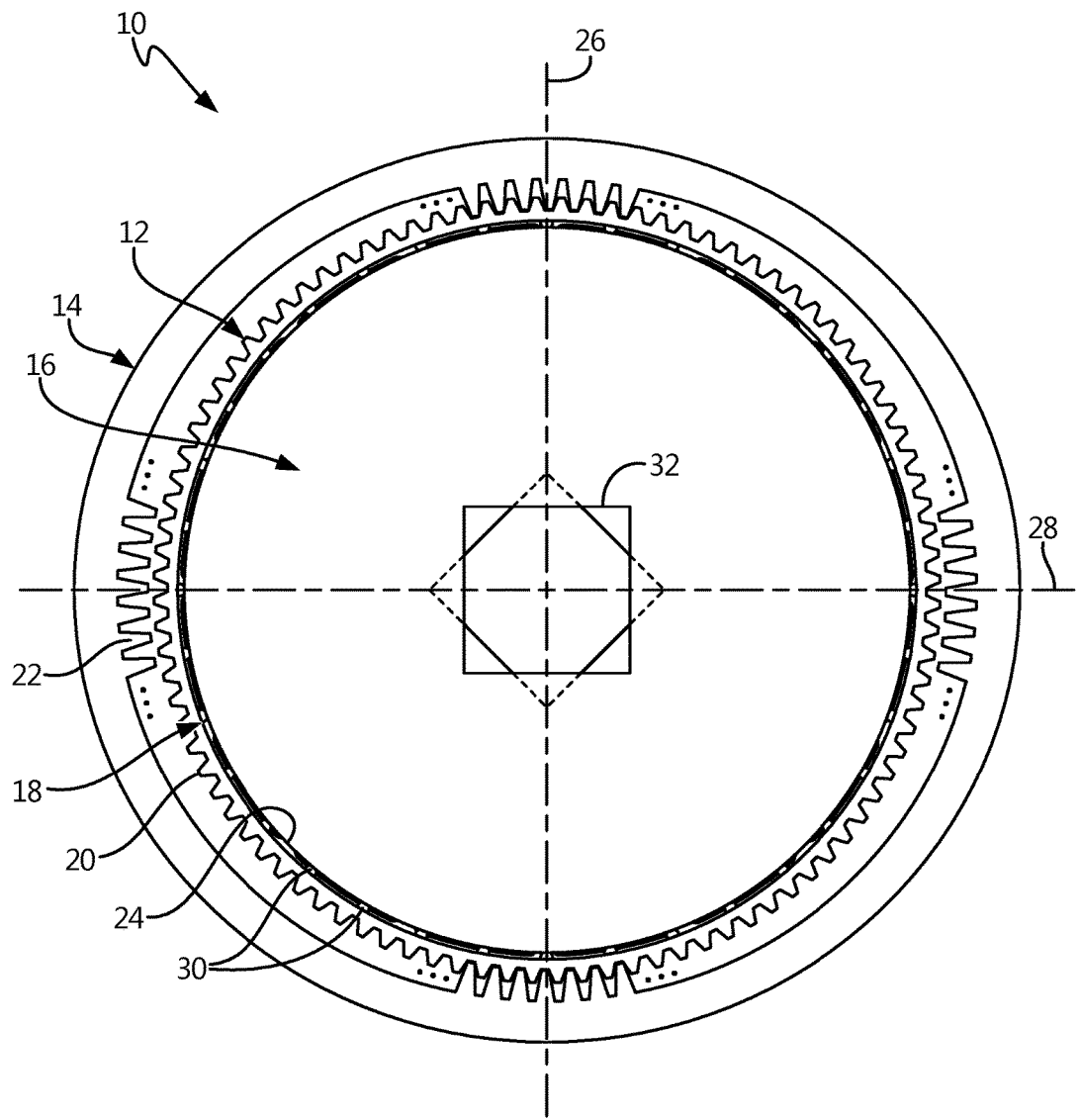
FIG. 1 is an elevation view of an embodiment of a compact flex gearbox.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

FIG. 1 is an elevation view of an embodiment of compact flex gearbox 10. Gearbox 10 includes flex gear 12, ring gear 14, wave generator 16, and radial bearing 18. Flex gear 12 is rotatably positioned in and surrounded by ring gear 14, and wave generator 16 is rotatably positioned in and surrounded by flex gear 12. Radial bearing 18 is positioned between and in contact with flex gear 12 and wave generator 16.

In the illustrated embodiment, flex gear 12 includes a plurality of gear teeth (flex teeth 20) that face radially outward along the exterior of flex gear 12. Flex teeth 20 engage the plurality of gear teeth (ring teeth 22) that face radially inward along the interior of the stationary ring gear 14. The number of ring teeth 22 is larger than the number of flex teeth 20 by an even number, for example, a tooth differential of two or four teeth. While only some of ring teeth 22 are shown in FIG. 1, the plurality of ring teeth 22 extends around the entire interior circumference of ring gear 14, as denoted by the dots adjacent the depicted ring teeth.

Wave generator 16 has a non-circular, radially outer face 24. More specifically, for use with two or four fewer flex teeth 20, outer face 24 has an elliptical shape with a longer major axis 26 and a shorter minor axis 28. Outer face 24 forces radial bearing 18 and the exterior of flex gear 12 into corresponding elliptical shapes. In the illustrated embodiment, radial bearing 18 is comprised of a plurality of spherical bearing elements 30 that are each in contact with flex gear 12 and wave generator 16. In alternative embodiments, radial bearing 18 can be a different configuration and/or type of bearing, such as a roller bearing or needle bearing.

During operation of gearbox 10, wave generator 16 is driven at wave interface feature 32 by a first shaft (not shown), for example, in a clockwise direction. Therefore, wave generator 16 rotates about an axis of gearbox 10 (while the axis is not enumerated, it exists at the intersection of major axis 26 and minor axis 28). Because ring gear 14 is stationary and has more ring teeth 22 than flex gear 12 has flex teeth 20, flex gear 12 rotates in a counterclockwise direction at a substantially slower rate than wave generator 16 rotates in the clockwise direction. This allows flex gear 12 to rotate a second shaft (not shown) that is connected to gear interface feature 34 at a fixed fraction of the speed that the first shaft is rotated, such that gearbox 10 has a high gear ratio. In an alternate embodiment, flex gear 12 can be driven and wave generator 16 can be the output such that gearbox 10 has a low gear ratio.

Figure 2:
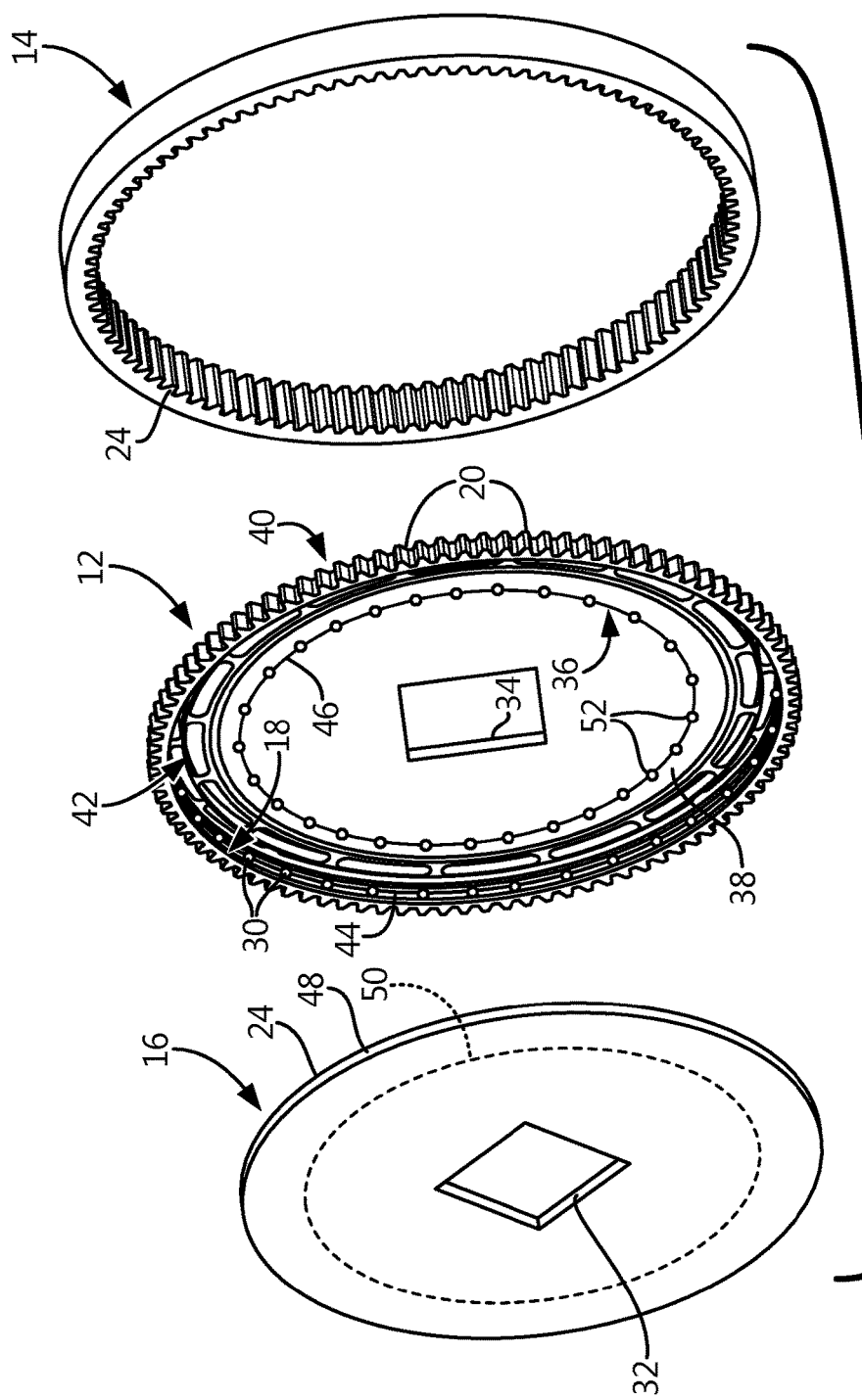
FIG. 2 is an exploded view of the compact flex gearbox of FIG. 1.

FIG. 2 is an exploded view of compact flex gearbox 10 of FIG. 1. Many of the features of gearbox 10 and its subcomponents are more visible in FIG. 2. For example, flex gear 12 includes hub 38 in which gear interface feature 34 is located and tooth ring 40 surrounding hub 38 and axially offset therefrom which includes flex teeth 20. Between hub 38 and tooth ring 40 is flex portion 42. Flex portion 42 is shown in greater detail in FIGS. 3A-3C, although in general, flex portion 42 comprises a plurality of axial and/or radial support elements and a plurality of circumferential flex elements that form a reticulation that is elastically deformable by wave generator 16. When tooth ring 40 and flex portion 42 are not being elastically deformed into an elliptical shape by wave generator 16, flex portion 42 and tooth ring 40 have toroidal shapes that form complete circular rings.

Flex gear 12 further includes an annular radial contact race 44, a component of radial bearing 18, which is located around the radially inner side of tooth ring 40. In addition, flex gear includes a circular axial contact race 46, a component of axial bearing 36, which is located on the side face of hub 38. To cooperate with flex gear 12, wave generator 16 includes an annular radial contact race 48, a component of radial bearing 18, which is located around outer face 24. In addition, flex gear includes a circular axial contact race 50, a component of axial bearing 36, which is located on the side face of wave generator 16.

Radial contact races 44 and 48 provide the contact surfaces for the plurality of bearing elements 30 of radial bearing 18. Although it is not shown in FIG. 2, bearing elements 30 can be separated by an annular cage in order to maintain proper spacing between bearing elements 30. Similarly, axial contact races 46 and 50 provide the contact surfaces for the plurality of bearing elements 52 of axial bearing 36. Although it is not shown in FIG. 2, bearing elements 52 can be separated by a circular cage in order to maintain desired spacing between bearing elements 52. In addition, axial bearing 36 can be a different configuration and/or type of bearing, such as a roller bearing or needle bearing. Bearings 18 and 36 allow for flex gear 12 and wave generator 16 to be proximate to each other while relative motion between the two components is occurring by minimizing friction there between.

Figure 3A:
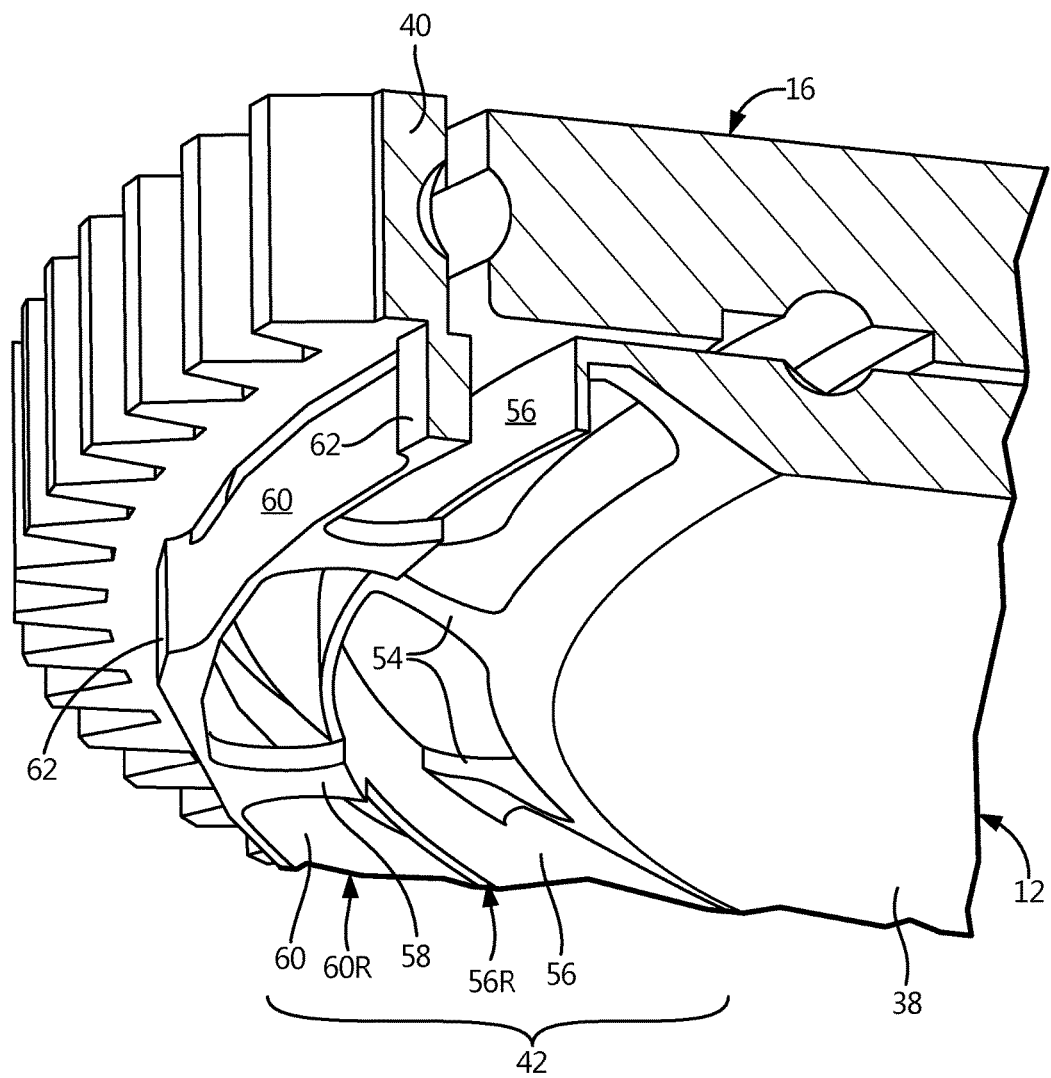
FIG. 3A is a perspective cross-sectional view of a portion of the compact flex gearbox taken along line 3-3 of FIG. 1.
Figure 3B:
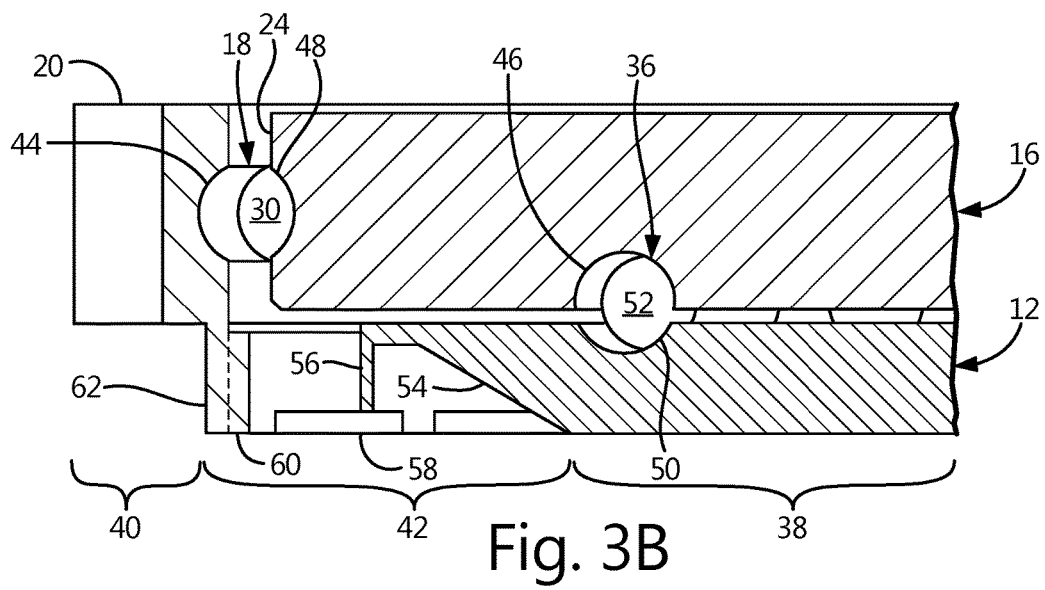
FIG. 3B is a side cross-sectional view of a portion of the compact flex gearbox taken along line 3-3 of FIG. 3C.
Figure 3C:
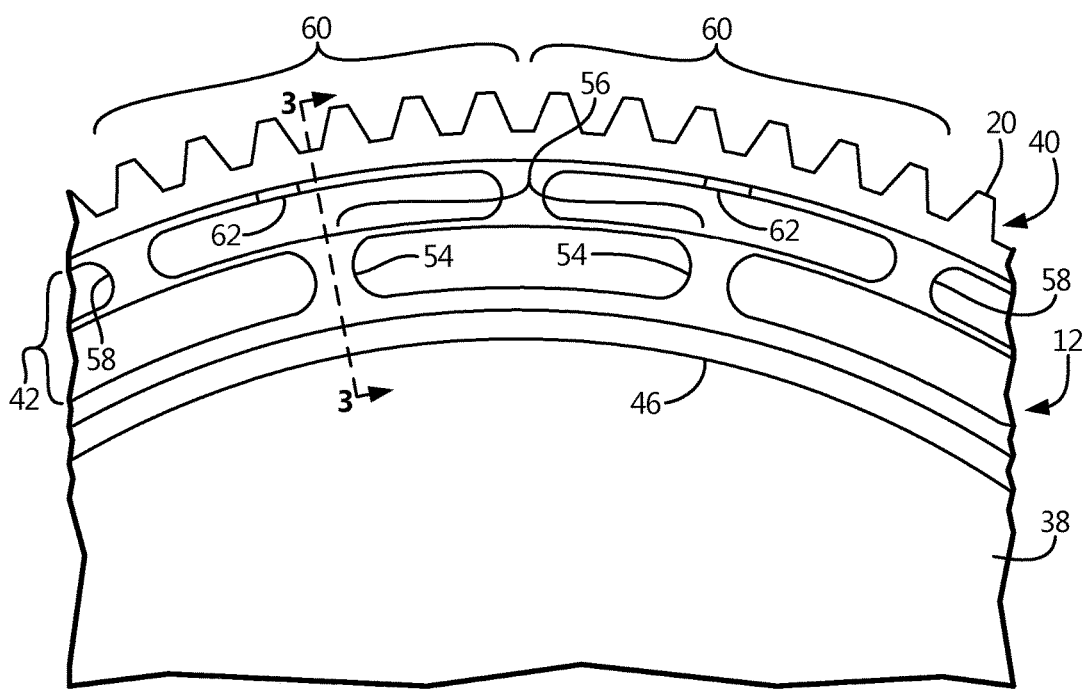
FIG. 3C is an elevation view of the portion of a flex gear of the compact flex gearbox.

FIG. 3A is a perspective cross-sectional view of a portion of compact flex gearbox 10 taken along line 3-3 of FIG. 1. FIG. 3B is a side cross-sectional view of the portion of compact flex gearbox 10 taken along line 3-3 of FIG. 1. FIG. 3C is an elevation view of flex gear 12. FIGS. 3A-3C will now be discussed together, with the immediate description of flex portion 42 primarily describing the radial relationships of the components of flex gear 12. Following that section, a description of the axial relationships of the components of flex gear 12 will commence.

In the illustrated embodiment, flex portion 42 comprises a plurality of circumferentially spaced apart inner support elements 54 that are connected to and extend radially (or at least partially radially) from hub 38. The connections between inner support elements 54 and hub 38 can have circumferentially filleted edges to help reduce stress concentrations. There is one or more inner flex elements 56 connected to the radially outer ends of inner support elements 54 that are adjacent to one another to form a continuous ring 56R. More specifically, in the illustrated embodiment, one arc-shaped inner flex element 56 is connected to and supported by one inner support element 54 at one end and is connected to and supported by the adjacent inner support element 54 at the opposite end, such that the ring 56R is connected to all of the inner support elements 54.

Moving further radially outward, a plurality of generally radially-extending medial support elements 58 are connected to the radially outer sides of inner flex elements 56. Each medial support element 58 is circumferentially spaced apart from each inner support element 54 in an offset, staggered, or alternating relationship. In the illustrated embodiment, each medial support element 58 is connected at a circumferential center of each inner flex element 56, approximately midway between the two corresponding inner support elements 54. There is one or more outer flex elements 60 (which can each be arc-shaped) connected to the radially outer ends of medial support elements 58 that are adjacent to one another to form a continuous ring 60R. More specifically, in the illustrated embodiment, one outer flex element 60 is connected to and supported by one medial support element 58 at one end and is connected to and supported by the adjacent medial support element 58 at the opposite end, such that the ring 60R is connected to all of the medial support elements 58. The connections between medial support elements 58 and inner flex elements 56 and outer flex elements 60 can have circumferentially filleted edges to help reduce stress concentrations.

Moving yet further radially outward, one or more outer support elements 62 are connected to the radially outer sides of outer flex elements 60. Each outer support element 62 extends generally radially from its respective outer flex element 60 and then extends axially towards wave generator 16 to connect to tooth ring 40. Such a dogleg shape of outer support elements 62 allows tooth ring 40 to be connected to hub 38 while allowing wave generator 16 to be radially inside of tooth ring 40. The connections between outer support elements 62 and outer flex elements 60 can have circumferentially filleted edges to help reduce stress concentrations.

Each outer support element 62 is circumferentially spaced apart from each medial support element 58 in an offset relationship. Although each outer support element 62 is circumferentially aligned with one inner support element 54 in the illustrated embodiment, such an arrangement is not necessary. In the illustrated embodiment, each outer support element 62 is connected at a circumferential center of each outer flex element 60, approximately midway between the two corresponding medial support elements 58.

With respect to the axial features of flex gear 12, in the illustrated embodiment, each of inner support elements 54 tapers in axial thickness as it extends radially outward from hub 38. This tapering occurs towards wave generator 16, such that the distance between inner support elements 54 and wave generator 16 is a substantially constant value despite the changing axial thickness of inner support elements 54.

Moving further radially outward, inner flex elements 56 extend axially away from wave generator 16 from inner support elements 54 which are connected on the radially inside surfaces of inner flex elements 56. In the illustrated embodiment, inner flex elements 56 have uniform axial and radial thicknesses. Medial support elements 58 extend from the opposite side (i.e., radially outside) of inner flex elements 56 that inner support elements 54 are connected to. Medial support elements 58 have uniform axial and radial thicknesses, as do outer flex elements 60. Outer flex elements 60 extend axially towards wave generator 16 from medial support elements 58. Thus, inner flex elements 56 and outer flex elements 60 partially axially overlap each other in that outer flex elements 60 are partially directly radially outward from inner flex elements 56, although inner flex elements 56 are positioned closer to wave generator 16 than outer flex elements 60 are.

While inner support elements 54 and medial support elements 58 are only a fraction of the axial thicknesses of inner flex elements 56 and outer flex elements 60, outer support elements 62 extend across the entire axial width of outer flex elements 60. Outer support elements 62 are configured to provide axial and radial gaps between tooth ring 40 and outer flex elements 60.

In general, the components and configuration of flex gear 12 allow for tooth ring 40 to be elastically flexed into an elliptical shape that varies in orientation due to the rotating major axis of wave generator 16. This flexing occurs due to flex elements 56 and 60 elastically deforming primarily in the radial direction, with outer flex elements 60 being radially elastically deformable due to the gaps between outer flex elements 60 and tooth ring 40. Thereby, continuous ring 60R can be larger in diameter (in at least some locations) than the inner diameter of tooth ring 40. In addition, some twisting between support elements 54, 58, and 62 would occur during operation as well. The twisting of flex elements 56 and 60 is due to inner support elements 54 being axially offset from medial support elements 58.

The configuration of flex portion 42 simulates the radial flexibility of the traditional long cup-shaped flex gear that is present in the prior art, but does so with a completely different configuration (i.e., by stacking flex elements 56 and 60 radially apart from each other and connecting them with circumferentially spaced, radially extending support elements 54, 58, and 62). This arrangement is radially flexible, but is substantially more resistant to circumferential or twisting deformation of hub 38 relative to tooth ring 40, which allows flex gear 12 to transmit torque loads between hub 38 and tooth ring 40. With such a configuration, flex gear 12 can be significantly axially shorter than a traditional flex gear, which allows compact flex gearbox 10 (shown in FIG. 1) to be significantly axially shorter than a traditional strain wave gearbox.

Furthermore, the embodiment of flex gear 12 shown in FIGS. 3A-3C allows for flex portion 42 to be manufactured easily using a lathe and a mill. More specifically, a lathe can be used to remove, for example, metallic material from a billet workpiece (not shown) in order to form flex elements 56 and 60. Then, a mill can be used to remove material from between adjacent support elements 54, 58, and 62 to form support elements 54, 58, and 62, respectively. In order for support elements 54 and 58 to be axially offset from one another, the billet workpiece will have been machined from side that is adjacent to wave generator 16 and from the opposite side that is distal from wave generator 16 when forming flex elements 56 and 60.

Depicted in FIGS. 3A-3C is one embodiment of the present invention, to which there are alternative embodiments. For example, there may be only one ring of flex elements. In such an embodiment, there would only be two sets of support elements—an inner set of support elements connected to the hub and the flex elements and an outer set of support elements connected to the tooth ring and the flex elements. For another example, the flex portion can include three or more rings of flex elements (which would necessitate additional sets of support elements). The number of generally concentric flex element rings is dictated by the compliance necessary, the allowable material stress, and the torque to be transmitted, among other factors. For a further example, the outer support elements can extend solely radially or axially. For yet another example; the voids between the support elements and the flex elements can be partially or wholly filled with material, and the material can have a different shape or material properties from the rest of the flex portion. For yet another example, the connections between the support elements and the flex elements shown in FIGS. 1-3C can be repositioned and/or reconfigured without substantial effect on the form and/or function of the flex gear. In yet further embodiments, the flex elements could be flat rather than arc-shaped and/or have a circumferentially varying radial and/or axial thickness. Moreover, the flex elements could be arranged in a discontinuous manner, rather than as a continuous ring.

Discussion of Possible Embodiments

The following are non-exclusive descriptions of possible embodiments of the present invention.

A flex gear according to an exemplary embodiment of this disclosure, among other possible things includes: a hub having an axis, a rim portion, and a first interface feature; a tooth ring including a first plurality of gear teeth; and a plurality of flex elements located between and connected to the rim portion and the tooth ring.

The flex gear of the preceding paragraph can optionally include, additionally and/or alternatively, any one or more of the following features, configurations and/or additional components:

A further embodiment of the foregoing flex gear, wherein the hub can further comprise a first contact race; and the tooth ring can further comprise a second contact race.

A further embodiment of any of the foregoing flex gears, wherein at least a portion of the plurality of flex elements together can form a continuous ring.

A further embodiment of any of the foregoing flex gears, wherein the flex gear can further comprise: a first plurality of support elements each connected to the hub and at least one of the plurality of flex elements; and a second plurality of support elements each connected to the tooth ring and at least one of the plurality of flex elements; wherein each of the plurality of flex elements extends circumferentially.

A further embodiment of any of the foregoing flex gears, wherein each of the first and second pluralities of support elements can extend radially.

A further embodiment of any of the foregoing flex gears, wherein the first plurality of support elements can be each connected to the at least one of the plurality of flex elements at a first flex element edge, and wherein the second plurality of support elements can be each connected to the at least one of the plurality of flex elements at a second, opposite flex element edge that is axially spaced apart from the first flex element edge.

A further embodiment of any of the foregoing flex gears, wherein each of the plurality of flex elements can include a first end, a second end, and a center portion between the first and second ends; the first end can be connected to a first one of the first plurality of support elements; the second end can be connected to a second one of the first plurality of support elements; and the center portion can be connected to one of the second plurality of support elements.

A further embodiment of any of the foregoing flex gears, wherein a first set of the plurality of flex elements together can form a first ring; and a second set of the plurality of flex elements together can form a second ring; and the flex gear can further comprise: a first plurality of support elements each connected to the hub and at least one of the first set of the plurality of flex elements; a second plurality of support elements each connected to at least one of the first set of the plurality of flex elements and at least one of the second set of the plurality of flex elements; and a third plurality of support elements each connected to at least one of the second set of the plurality of flex elements and the tooth ring; wherein each of the second plurality of support elements is circumferentially offset from each of the first and third pluralities of support elements.

A further embodiment of any of the foregoing flex gears, wherein the first set of the plurality of flex elements can extend axially in a first direction from the first plurality of support elements and the second set of the plurality of flex elements can extend axially in a second, opposite direction from the second plurality of support elements.

A further embodiment of any of the foregoing flex gears, wherein the third plurality of support elements each can extend axially and radially.

A flex gearbox can comprise: any of the foregoing flex gears, wherein the flex gear further comprises a first contact race on a radially inner face; a ring gear surrounding the flex gear, the ring gear including a second plurality of gear teeth for contacting the first plurality of gear teeth, wherein the second plurality of gear teeth includes more gear teeth than the first plurality of gear teeth; a wave generator positioned in the flex gear and including a second contact race on a non-circular radially outer face and a second interface feature; a first bearing positioned between the flex gear and the wave generator that is in contact with the first contact race and the second contact race.

A flex gearbox according to an exemplary embodiment of this disclosure, among other possible things includes: a flex gear including a first plurality of gear teeth, a first contact race on a radially inner face, a second contact race on a first side face, and a hub with a first interface feature; a ring gear surrounding the flex gear, the ring gear including a second plurality of gear teeth for contacting the first plurality of gear teeth, wherein the second plurality of gear teeth includes more gear teeth than the first plurality of gear teeth; a wave generator positioned in the flex gear and including a third contact race on a non-circular radially outer face, a fourth contact race on a second side face, and a second interface feature; a first bearing positioned between the flex gear and the wave generator that is in contact with the first contact race and the third contact race; and a second bearing positioned between the flex gear and the wave generator that is in contact with the second contact race and the fourth contact race.

The flex gearbox of the preceding paragraph can optionally include, additionally and/or alternatively, any one or more of the following features, configurations and/or additional components:

A further embodiment of the foregoing flex gearbox, wherein the flex gear can comprise: a hub having an axis, a rim portion, and an interface feature; a plurality of flex elements extending from the rim portion; a tooth ring connected to the plurality of flex elements, the tooth ring including a plurality of gear teeth.

A further embodiment of any of the foregoing flex gearboxes, the plurality of flex elements together can form a continuous ring.

A further embodiment of any of the foregoing flex gearboxes, wherein the flex gear can comprise: a hub portion including an interface feature and a first plurality of support elements that extend from the hub portion; a tooth ring including a plurality of gear teeth and a second plurality of support elements that extend from the tooth ring; and a flex ring connected to the first and second pluralities of support elements; wherein the each of the first plurality of supports is circumferentially offset from each of the second plurality of support elements.

A further embodiment of any of the foregoing flex gearboxes, wherein: a first set of the plurality of flex elements together can form a first ring; and a second set of the plurality of flex elements together can form a second ring; and the flex gear can further comprise: a first plurality of support elements each connected to the hub and at least one of the first set of the plurality of flex elements; a second plurality of support elements each connected to at least one of the first set of the plurality of flex elements and at least one of the second set of the plurality of flex elements; and a third plurality of support elements each connected to at least one of the second set of the plurality of flex elements and the tooth ring.

A further embodiment of any of the foregoing flex gearboxes, wherein the first set of the plurality of flex elements can extend axially away from the wave generator from the first plurality of support elements and the second set of the plurality of flex elements can extend axially toward the wave generator from the second plurality of support elements.

A flex gear according to an exemplary embodiment of this disclosure, among other possible things includes: a hub portion including an axis, an interface feature, and a first plurality of support elements that extend from the hub portion; a tooth ring including a plurality of gear teeth and a second plurality of support elements that extend from the tooth ring; and a flex ring connected to the first and second pluralities of support elements; wherein the each of the first plurality of supports is circumferentially offset from each of the second plurality of support elements.

The flex gear of the preceding paragraph can optionally include, additionally and/or alternatively, any one or more of the following features, configurations and/or additional components:

A further embodiment of the foregoing flex gear, wherein the flex gear can further comprising: a second flex ring wherein the second plurality of support elements is connected to the second flex ring instead to the first flex ring; and a third plurality of support elements that extend between the first and second flex rings.

A flex gearbox can comprise: a further embodiment of any of the foregoing flex gears, wherein the flex gear further comprises a first contact race on a radially inner face; a ring gear surrounding the flex gear, the ring gear including a second plurality of gear teeth for contacting the first plurality of gear teeth, wherein the second plurality of gear teeth includes more gear teeth than the first plurality of gear teeth; a wave generator positioned in the flex gear and including a second contact race on a non-circular radially outer face and a second interface feature; and a first bearing positioned between the flex gear and the wave generator that is in contact with the first contact race and the second contact race.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A flex gear comprising:
   a hub having an axis, a rim portion, a first interface feature, and a first contact race;
   a tooth ring including a first plurality of gear teeth and a second contact race; and
   a plurality of flex elements located between and connected to the rim portion and the tooth ring.

2. The flex gear of claim 1, wherein at least a portion of the plurality of flex elements together form a continuous ring.

3. The flex gear of claim 1, further comprising:
   a first plurality of support elements each connected to the hub and at least one of the plurality of flex elements; and
   a second plurality of support elements each connected to the tooth ring and the at least one of the plurality of flex elements;
   wherein each of the plurality of flex elements extends circumferentially.

4. The flex gear of claim 3, wherein each of the first and second pluralities of support elements extend radially.

5. The flex gear of claim 3, wherein the first plurality of support elements are each connected to the at least one of the plurality of flex elements at a first flex element edge, and wherein the second plurality of support elements are each connected to the at least one of the plurality of flex elements at a second, opposite flex element edge that is axially spaced apart from the first flex element edge.

6. The flex gear of claim 3, wherein:
   each of the plurality of flex elements includes a first end, a second end, and a center portion between the first and second ends;
   the first end is connected to a first one of the first plurality of support elements;
   the second end is connected to a second one of the first plurality of support elements; and
   the center portion is connected to one of the second plurality of support elements.

7. The flex gear of claim 1, wherein:
   a first set of the plurality of flex elements together form a first ring; and
   a second set of the plurality of flex elements together form a second ring; and
   the flex gear further comprises:
      a first plurality of support elements each connected to the hub and at least one of the first set of the plurality of flex elements;
      a second plurality of support elements each connected to at least one of the first set of the plurality of flex elements and at least one of the second set of the plurality of flex elements; and
      a third plurality of support elements each connected to at least one of the second set of the plurality of flex elements and the tooth ring;
      wherein each of the second plurality of support elements is circumferentially offset from each of the first and third pluralities of support elements.

8. The flex gear of claim 7, wherein the first set of the plurality of flex elements extend axially in a first direction from the first plurality of support elements and the second set of the plurality of flex elements extend axially in a second, opposite direction from the second plurality of support elements.

9. The flex gear of claim 7, wherein the third plurality of support elements each extend axially and radially.

10. A flex gearbox comprising:
    the flex gear of claim 1 and further comprising a first contact race on a radially inner face;
    a ring gear surrounding the flex gear, the ring gear including a second plurality of gear teeth for contacting the first plurality of gear teeth, wherein the second plurality of gear teeth includes more gear teeth than the first plurality of gear teeth;
    a wave generator positioned in the flex gear and including a second contact race on a non-circular radially outer face and a second interface feature;
    a first bearing positioned between the flex gear and the wave generator that is in contact with the first contact race and the second contact race.

11. A flex gearbox comprising:
    a flex gear including a first plurality of gear teeth, a first contact race on a radially inner face, a second contact race on a first side face, and a hub with a first interface feature;
    a ring gear surrounding the flex gear, the ring gear including a second plurality of gear teeth for contacting the first plurality of gear teeth, wherein the second plurality of gear teeth includes more gear teeth than the first plurality of gear teeth;
    a wave generator positioned in the flex gear and including a third contact race on a non-circular radially outer face, a fourth contact race on a second side face, and a second interface feature;
    a first bearing positioned between the flex gear and the wave generator that is in contact with the first contact race and the third contact race; and
    a second bearing positioned between the flex gear and the wave generator that is in contact with the second contact race and the fourth contact race.

12. The flex gearbox of claim 11, wherein the flex gear comprises:
    a hub having an axis, a rim portion, and an interface feature;
    a plurality of flex elements extending from the rim portion;
    a tooth ring connected to the plurality of flex elements, the tooth ring including a plurality of gear teeth.

13. The flex gearbox of claim 12, wherein the plurality of flex elements together form a continuous ring.

14. The flex gearbox of claim 11, wherein the flex gear comprises:
    a hub portion including an interface feature and a first plurality of support elements that extend from the hub portion;
    a tooth ring including a plurality of gear teeth and a second plurality of support elements that extend from the tooth ring; and
    a flex ring connected to the first and second pluralities of support elements;
    wherein the each of the first plurality of supports is circumferentially offset from each of the second plurality of support elements.

15. The flex gearbox of claim 12, wherein:
   a first set of the plurality of flex elements together form a first ring; and
   a second set of the plurality of flex elements together form a second ring; and
   the flex gear further comprises:
      a first plurality of support elements each connected to the hub and at least one of the first set of the plurality of flex elements;
      a second plurality of support elements each connected to the at least one of the first set of the plurality of flex elements and at least one of the second set of the plurality of flex elements; and
      a third plurality of support elements each connected to the at least one of the second set of the plurality of flex elements and the tooth ring.

16. The flex gearbox of claim 15, wherein the first set of the plurality of flex elements extend axially away from the wave generator from the first plurality of support elements and the second set of the plurality of flex elements extend axially toward the wave generator from the second plurality of support elements.

17. A flex gear comprising:
   a hub portion including an axis, an interface feature, and a first plurality of support elements that extend from the hub portion;
   a tooth ring including a plurality of gear teeth and a second plurality of support elements that extend from the tooth ring; and
   a flex ring connected to the first and second pluralities of support elements;
   wherein the each of the first plurality of supports is circumferentially offset from each of the second plurality of support elements.

18. The flex gear of claim 17, further comprising:
   a second flex ring wherein the second plurality of support elements is connected to the second flex ring instead to the first flex ring; and
   a third plurality of support elements that extend between the first and second flex rings.

19. A flex gearbox comprising:
   the flex gear of claim 17 and further comprising a first contact race on a radially inner face;
   a ring gear surrounding the flex gear, the ring gear including a second plurality of gear teeth for contacting the first plurality of gear teeth, wherein the second plurality of gear teeth includes more gear teeth than the first plurality of gear teeth;
   a wave generator positioned in the flex gear and including a second contact race on a non-circular radially outer face and a second interface feature; and
   a first bearing positioned between the flex gear and the wave generator that is in contact with the first contact race and the second contact race.

* * * * *